(12) United States Patent
Fujita et al.

(10) Patent No.: US 12,131,158 B2
(45) Date of Patent: Oct. 29, 2024

(54) COMMUNICATION CONTROL APPARATUS AND COMMUNICATION METHOD

(71) Applicants: DENSO TEN Limited, Hyogo (JP); TOYOTA JIDOSHA KABUSHIKI KAISHA, Toyota (JP)

(72) Inventors: Kazuki Fujita, Kobe (JP); Katsutomo Sasakura, Kobe (JP); Shumpei Omura, Toyota (JP)

(73) Assignees: DENSO TEN Limited, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 18/077,368

(22) Filed: Dec. 8, 2022

(65) Prior Publication Data

US 2023/0297380 A1 Sep. 21, 2023

(30) Foreign Application Priority Data

Mar. 16, 2022 (JP) ................................ 2022-041164

(51) Int. Cl.
  *G06F 9/32* (2018.01)
  *G06F 9/48* (2006.01)
  *G06F 13/24* (2006.01)

(52) U.S. Cl.
  CPC ............ *G06F 9/327* (2013.01); *G06F 9/4843* (2013.01); *G06F 13/24* (2013.01)

(58) Field of Classification Search
  CPC .......... G06F 13/24; G06F 9/327; G06F 9/4843
  See application file for complete search history.

(56) References Cited

U.S. PATENT DOCUMENTS

| 6,434,651 B1 * | 8/2002 | Gentry, Jr. ............ H04L 49/901 710/260 |
| 6,477,181 B1 * | 11/2002 | Fujimori ............ H04N 21/4305 370/476 |
| 7,979,594 B2 * | 7/2011 | Bartling .................. H04L 49/90 710/5 |
| 2005/0060476 A1 * | 3/2005 | Tamura ................. G06F 13/124 710/305 |

FOREIGN PATENT DOCUMENTS

JP 2021-120792 A 8/2021

* cited by examiner

*Primary Examiner* — Zachary K Huson
(74) *Attorney, Agent, or Firm* — Oliff PLC

(57) ABSTRACT

The communication control apparatus includes a communication apparatus and a controller. The communication apparatus saves received data in a reception buffer, executes transfer of the received data to a transfer destination buffer from the reception buffer, erases the transferred data from the reception buffer, and interrupts the transfer upon detecting abnormality. The controller transmits data or a command to the communication apparatus. The controller checks whether the data are saved in the reception buffer after transmitting the data to the control apparatus, and transmits a command for causing the communication apparatus to execute a software reset when at least some proportion of the data are saved.

4 Claims, 5 Drawing Sheets

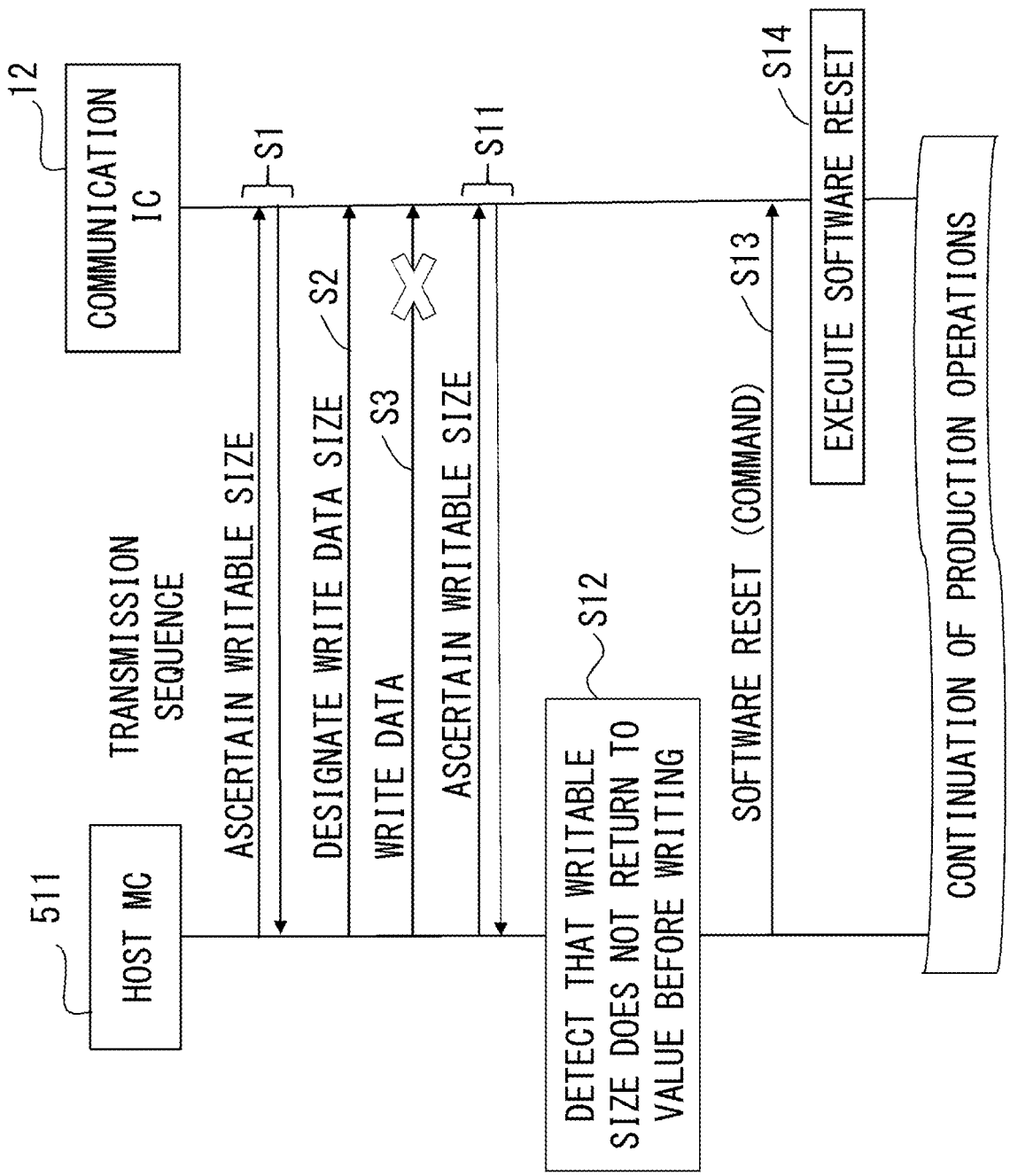

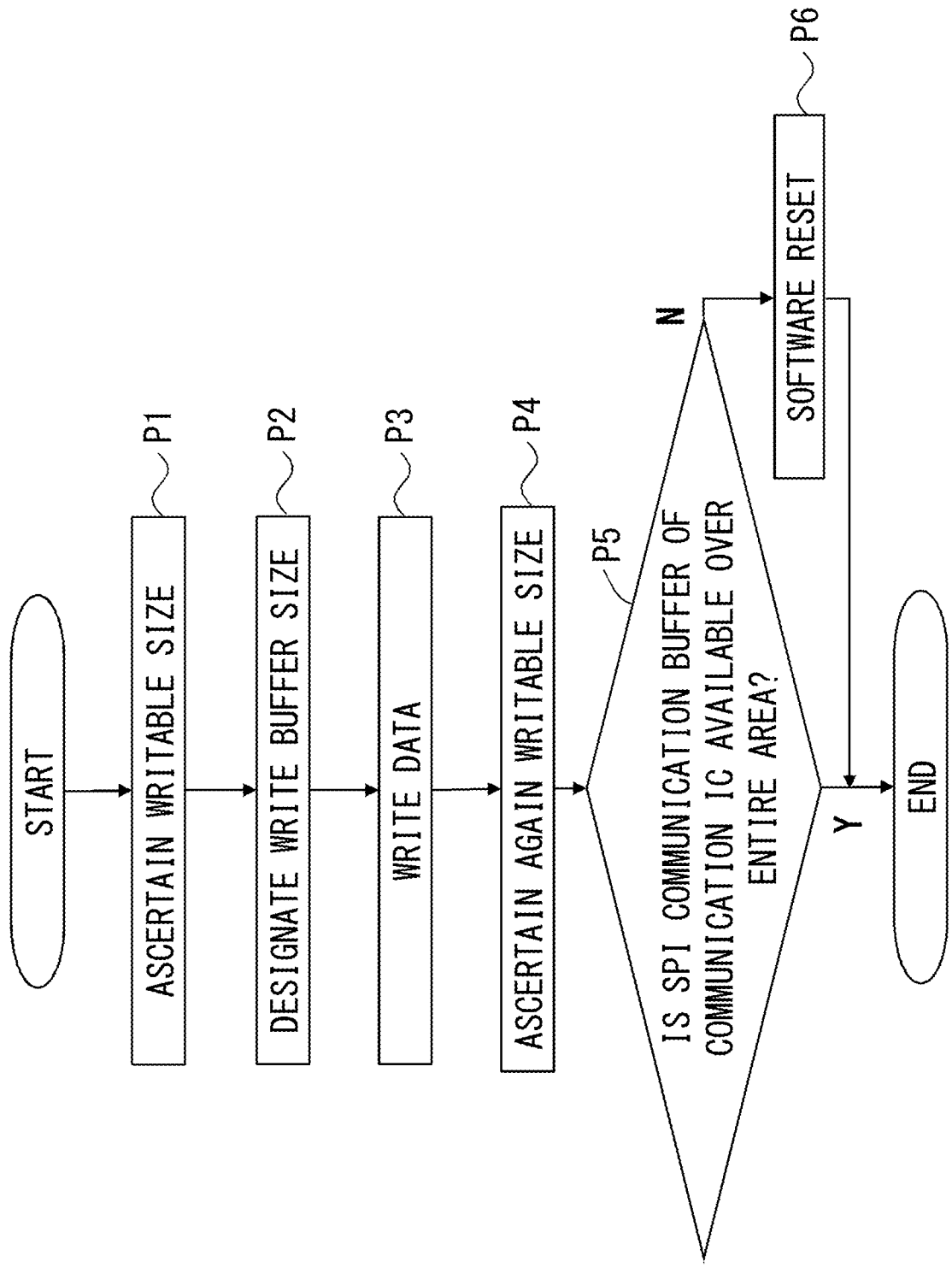

COMMUNICATION CONTROL APPARATUS AND COMMUNICATION METHOD

CROSS REFERENCE TO THE RELATED APPLICATION

This application claims the benefit of Japanese Patent Application No. 2022-41164, filed on Mar. 16, 2022, which is hereby incorporated by reference herein in its entirety.

BACKGROUND

Technical Field

The present disclosure pertains to a communication control apparatus and a communication method.

Description of the Related Art

A system of an electronic device and equivalents is equipped with a variety of Integrated Circuits (ICs) to perform mutual communications between or among the multiple ICs, thus attaining functions of the system. There is a case of not mounting a mechanism for detecting a communication error in the communications between the ICs, depending on specifications of the system or communication environments. This is because of, e.g., a case of giving a priority to executing a data transfer easily between the ICs or a case in which an occurrence of the communication error is hard to assume originally.

[Patent Document 1] Japanese Patent Laid-Open Publication No. 2021-120792

SUMMARY

There exists, however, a difficult case to handle a communication error actually occurring in a system not mounted with the mechanism for detecting the communication error. An aspect of an embodiment of the disclosure resides in easily handling the communication error as early as possible in the system not incorporating the mechanism of detecting the communication error.

One aspect of an embodiment of the disclosure is illustrated by a communication control apparatus. The communication control apparatus includes a communication apparatus configured to save received data in a reception buffer, execute transfer of the received data to a transfer destination buffer from the reception buffer, erase the transferred data from the reception buffer, and interrupt the transfer upon detecting abnormality and a controller configured to transmit data or a command to the communication apparatus. The controller checks whether, after transmitting the data to the communication apparatus, the transmitted data are saved in the reception buffer, and, when at least some proportion of the transmitted data are saved in the reception buffer, transmits a command for causing the communication apparatus to execute a software reset.

The communication control apparatus in easily handles the communication error as early as possible.

BRIEF DESCRIPTION OF THE DRAWINGS

FIG. 4 is a sequence chart illustrating a data transmission sequence in which the communication control apparatus according to the embodiment detects an occurrence of the communication error and handles the detected communication error;

FIG. 5 is a flowchart illustrating processes of a host MC in the embodiment.

DESCRIPTION OF THE EMBODIMENTS

A communication control apparatus and a communication method according to one embodiment will hereinafter be described with reference to drawings. The communication control apparatus includes a plurality of ICs exemplified by microcomputers or microcontrollers (both of which will hereinafter be simply referred to as "MCs"), and image processing ICs or ICs for communications with the outside. At least some of these ICs do not have any mechanisms to detect errors in mutual communications in the embodiment.

Figure 1:
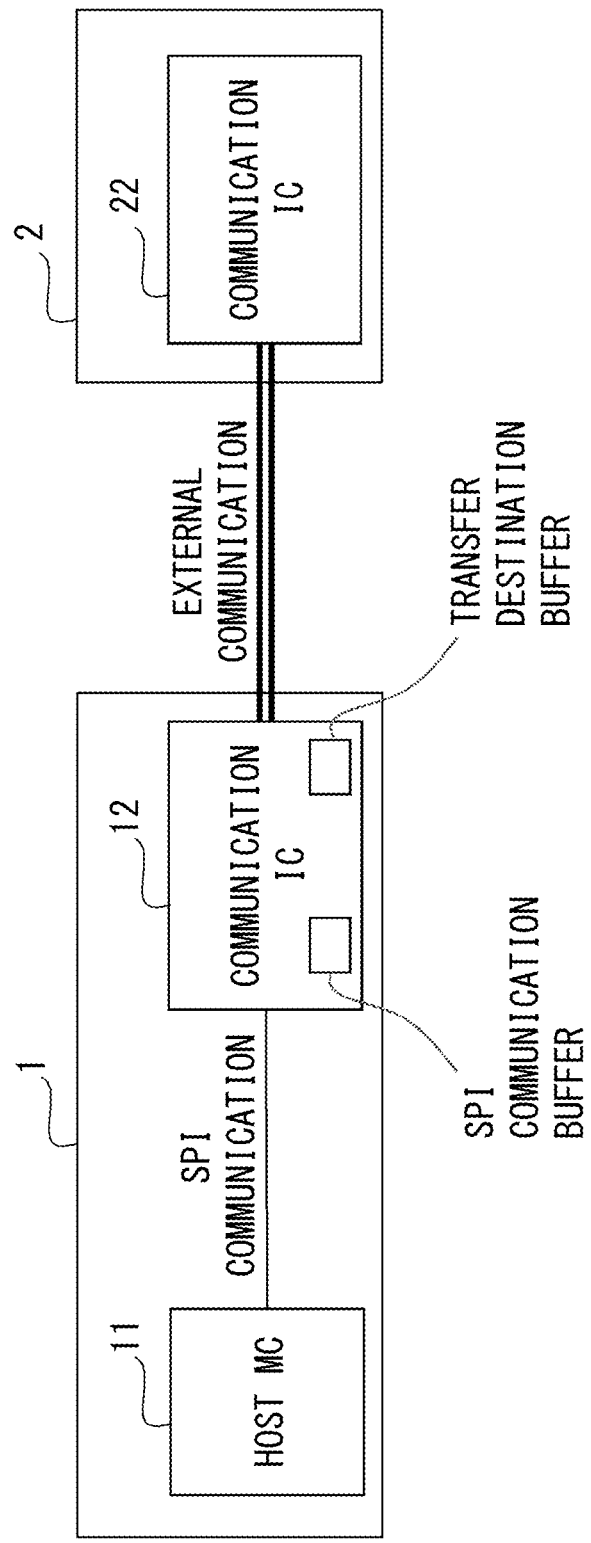
FIG. 1 is a diagram illustrating a configuration of a communication control apparatus according to an embodiment.

FIG. 1 illustrates a configuration of a communication control apparatus 1 according to the embodiment. Note that FIG. 1 also depicts an operation target apparatus 2 connectible to the communication control apparatus 1. The communication control apparatus 1 is exemplified by a charging system mounted in an Electric Vehicle (EV). The operation target apparatus 2 is exemplified by a charging equipment of a charging stand. Accordingly, the communication control apparatus 1 includes a communication IC 12 that performs external communications with the charging stand and equivalents together with a host MC 11. On the other hand, the operation target apparatus 2 includes a communication IC 22 that performs the communications with the communication control apparatus 1 defined as the in-vehicle charging system. The communication ICs 12, 22 are the ICs to perform the external communications by establishing a connection between the EV and the charging stand. Each of the communication ICs 12, 22 internally includes a Central Processing Unit (CPU), a memory, an Input/Output (I/O) interface, a communication interface and equivalents, which are isolated from an electric power line.

The host MC 11 includes the CPU, the memory, the I/O interface and equivalents. The host MC 11 executes a computer program deployed in an executable manner on the memory, and thereby operates as the communication control apparatus 1. The host MC 11 communicates with the operation target apparatus 2 via the communication IC 12, and charges a battery mounted in the EV with electric power of the charging equipment.

In the embodiment, the host MC 11 is connected to the communication IC 12 through Serial Peripheral Interface (SPI) communications, and thus controls the communication IC 12. Incidentally, it does not mean that the connection between the host MC 11 and the communication IC 12 is limited to the connection based on the SPI communications. For example, the host MC 11 may be connected to the communication IC 12 via an Inter-Integrated Circuit (I2C) and other interfaces.

The CPU of the communication IC 12 according to the embodiment performs the SPI communications with the host MC 11 through the computer program exemplified by firmware and software deployed in the executable manner on the_ memory. To be specific, the communication IC 12 receives commands or data conforming with the SPI communications from the host MC 11, and executes processes based on the computer program exemplified by the firmware and the software in accordance with the commands given from the host MC 11. The communication IC 12 according to the embodiment does not mount, however, a mechanism such as Checksum and Cyclic Redundancy Check (CRC) to determine a degree of certainty of the communication data when performing the SPI communications. The communication IC 12 is thereby unable to determine abnormality due to a communication error and equivalents as exemplified by a bit misalignment and fragmentation of a communication frames when communicating with the host MC 11. The communication IC 12 includes an SPI communication buffer serving as a reception buffer when performing the SPI communications, and a transfer destination buffer when performing the external communications. The communication IC 12 temporarily receives the data from the host MC 11 by the SPI communication buffer, and transfers the received data to the transfer destination buffer. At that time, the communication IC 12 erases the data transferred to the transfer destination buffer from the SPI communication buffer. Subsequently, the communication IC 12 transmits the data in the transfer destination buffer to the operation target apparatus 2 through the external communications.

The communication IC 12 is configured to, when an abnormal state caused by the communication error and equivalents continues, self-detect a congestion in a queueing process of the SPI communications due to timeout of a timer and conduct a hardware reset. Note that the communication IC 12 gets into a congested status in the queueing process of the SPI communications in the abnormal state, and is thereby disabled from continuing to transfer the data to the transfer destination buffer from the SPI communication buffer and disabled from continuing to execute a transmission process based on the external communications from the transfer destination buffer. The computer program exemplified by the firmware and software deployed in the executable manner on the memory is temporarily cleared by the hardware reset which may be called as hardware-based reset. Accordingly, after the hardware reset, the communication IC 12 deploys again the computer program in an executable manner on the memory. Hence, for example, when the abnormality occurs due to the communication error and the equivalents during the charging operation at the charging stand, the abnormality might lead to such a situation as to stop the charging system including the communication control apparatus 1 in excess of allowed time for which a user is able to stand by.

Comparative Example

Figure 2:
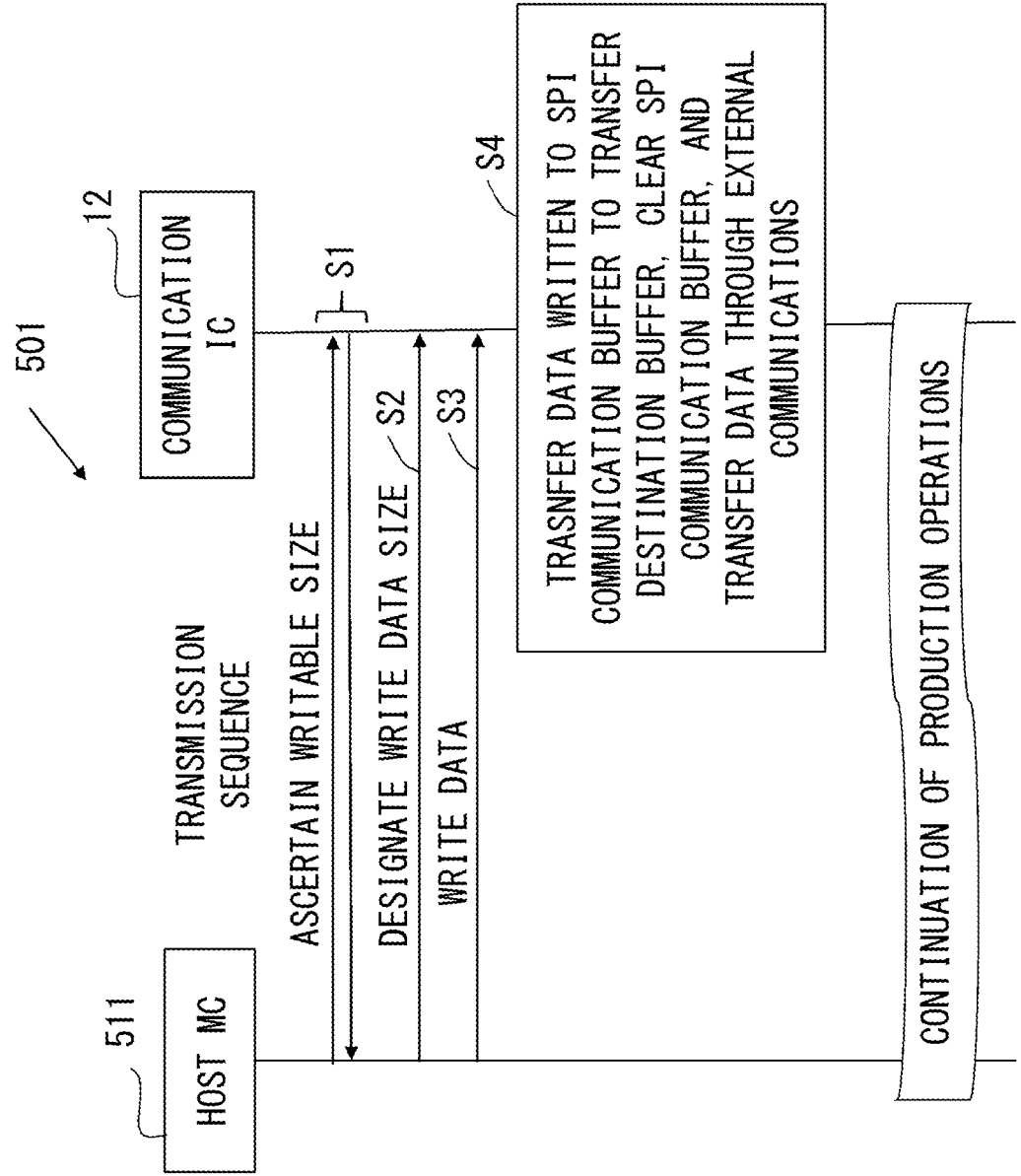
FIG. 2 is a sequence chart illustrating a data transmission sequence when in a normal operation with no communication error.
Figure 3:
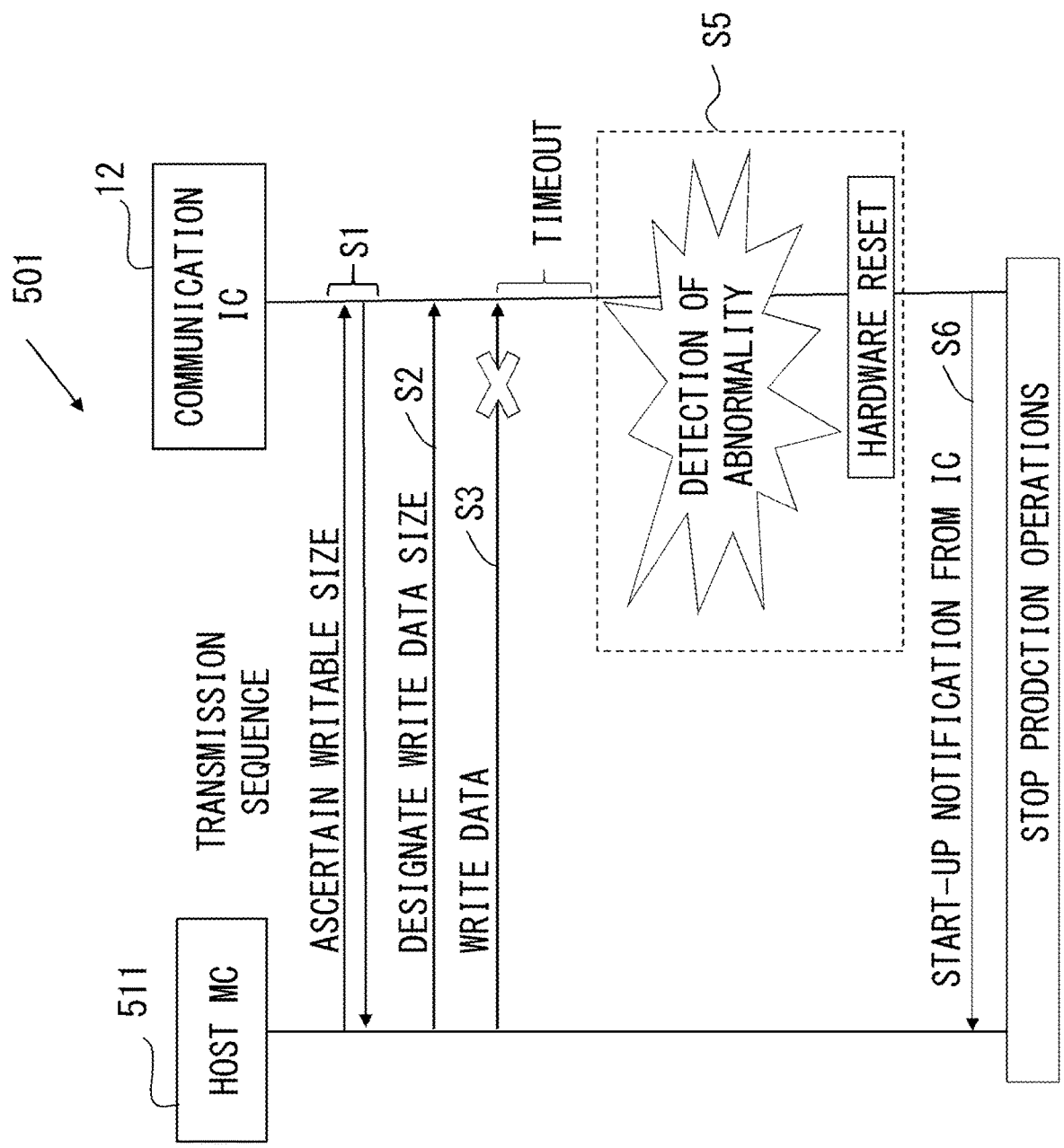
FIG. 3 is a sequence chart illustrating a data transmission sequence when in an abnormal state due to the communication error in a comparative example.

To start with, FIGS. 2 and 3 illustrate processes of the communication control apparatus 501 according to a comparative example. FIG. 2 is a sequence chart illustrating a data transmission sequence when in a normal operation with no communication error. A communication control apparatus 501 includes a host MC 511 and the communication IC 12.

In this process, the host MC 511 ascertains a writable size for checking a free space of the SPI communication buffer of the communication IC 12 (S1). The host MC 511 transmits an acknowledgement command for ascertaining the writable size defined as the free space of the SPI communication buffer to the communication IC 12, and obtains the free space as a response thereof in this process.

Next, the host MC 511 checks whether a write data size of this time is smaller than the free space (writable size) of the SPI communication buffer of the communication IC 12. When the write data size of this time is smaller than the free space (writable size) of the SPI communication buffer of the communication IC 12, the host MC 511 designates the write data size in the communication IC 12 (S2). The host MC 511 then writes the data to the communication IC 12 (S3). The host MC 511 normally writes the data, in which case the communication IC 12 transfers the data written to the SPI communication buffer to the transfer destination buffer for the external communications, and erases the transferred data from the SPI communication buffer. In other words, the communication IC 12 clears the SPI communication buffer, and transfers the data in the transfer destination buffer to the operation target apparatus 2 through the external communications (S4). Thereafter, the communication control apparatus 501 continues product-related operations. For example, the EV is charged with the electric power at the charging stand.

As described above, the SPI communication buffer may be said to be a reception buffer in the SPI communications of the communication IC 12. The process in S4 includes storing the received data in the reception buffer (SPI communication buffer), transferring the received data to the transfer destination buffer from the reception buffer (SPI communication buffer), and erasing the transferred data from the reception buffer (SPI communication buffer). In other words, the process in S4 may be said to be one example of a data processing function.

FIG. 3 is a sequence chart illustrating a data transmission sequence when in an abnormal state due to the communication error in the comparative example. The processes in S1 through S3 in FIG. 3 are the same as those in FIG. 2. In FIG. 3, however, the abnormality occurs in the data write by way of the data transfer to the communication IC 12 from the host MC 511. For instance, the abnormality is exemplified such that the data do not correctly arrive at the communication IC 12 because of noises entering an SPI communication line. Hereat, the communication IC 12 determines that a data count is less than the set write data size, and waits till reaching the set write data size. Even when a predetermined period of time elapses, however, the transmitted data count is less than the set write data size, in which case the communication IC 12 detects the abnormality. For example, a predetermined timer is timed out, whereby the communication IC 12 may detect the abnormality. Subsequently, the communication IC 12 executes the hardware reset (S5). The transfer to the transfer destination buffer from the SPI communication buffer is interrupted by the process in S5. Therefore, the process in S5 may be said to be one example of an abnormality processing function of interrupting the transfer. The communication IC 12 may also be said to be one example of a communication apparatus having the data processing function and the abnormality processing function.

The communication IC 12 having conducted the hardware reset restarts and makes a start-up notification to the host MC 511 (S6). However, with the hardware reset being done, it follows that the program exemplified by the firmware on the memory in the communication IC 12 is cleared, and the communication IC 12 gets restarted. With the communication IC 12 getting restarted, it follows that the product-related operations halt for a relatively long period of time. As a result, such a situation arises that a process, e.g., a charging process of the communication control apparatus 501 is disabled from being executed for a predetermined period of time or longer.

Embodiment

Processes of the communication control apparatus 1 according to the embodiment will hereinafter be exemplified with reference to FIGS. 4 and 5. FIG. 4 is a sequence chart illustrating a data transmission sequence in which the communication control apparatus 1 according to the embodiment detects an occurrence of the communication error and handles the detected communication error. Processes in S1 through S3 in FIG. 4 are the same as those in FIGS. 2 and 3. The host MC 11 may be said to be one example of a controller to transmit data or a command to the communication IC 12 defined as a communication apparatus.

In the present embodiment also, such a case is assumed that the abnormality occurs in the data write to the communication IC 12 by the host MC 11 (S3). For instance, in the data reception process of the communication IC 12, the abnormality is detected due to the timeout and equivalents, thereby interrupting the process. In the processes of FIG. 4, however, the host MC 11, after writing the data in S3, ascertains again the writable size in order to check the free space of the SPI communication buffer of the communication IC 12 (S11). In this process, the host MC 11 transmits an acknowledgement command for ascertaining the writable size as the free space of the SPI communication buffer to the communication IC 12, and obtains the free space of the SPI communication buffer byway of a response thereof. The data write in S3 is normally carried out, in which case the data written to the SPI communication buffer are transferred to the transfer destination buffer on the order of magnitude in terms of time that is by far shorter than command transmission/reception time between the host MC 11 and the communication IC 12. Subsequently, the data written to the SPI communication buffer are cleared. Accordingly, the host MC 11 ascertains the free space of the SPI communication buffer, i.e., the writable size and is thereby enabled to determine whether the data write in S3 is normally done. To be specific, the host MC 11 operating as the controller ascertains the writable size after transmitting the data to the communication IC 12 serving as the communication apparatus, thus checking whether the data are saved in the SPI communication buffer defined as the reception buffer.

Subsequently, the host MC 11 determines whether the writable size is set back to a value before the data write in S3. In other words, the host MC 11 has already ascertained the writable size in S1 before writing the data to the communication IC 12 in S3. The host MC 11 ascertains again the writable size in S11 after writing the data to the communication IC 12 in S3. When there is a discrepancy between the writable sizes of the data written to the communication IC 12 before and after writing the data by way of data transmission, the host MC 11 determines that the writable size is not set back to the value before the data write. In this case, the host MC 11 recognizes that at least some proportion of the data transmitted to the communication IC 12 in the data write in S3 are saved in the SPI communication buffer. In other words, it follows that the process of transferring the data to the transfer destination buffer from the SPI communication buffer remains stopped halfway.

Upon detecting that the writable size is not set back to the value before the data write in S3 (S12), the host MC 11 transmits a reset command for executing software reset which may be called as software-based reset to the communication IC 12 (S13). The reset command may be said to be one example of a command for executing the software reset. Namely, when at least some proportion of the data transmitted for the data write in S3 are saved in the SPI communication buffer, the host MC 11 causes the communication IC 12 to execute the software reset in accordance with the reset command. Note that the writable size is set back to the value before the data write in S3, which event is referred to as "the SPI communication buffer gets empty" in the embodiment. This implies that the data written to the SPI communication buffer by the data write are transferred to the transfer destination buffer, and the data written to the SPI communication buffer are cleared from the SPI communication buffer. The processes in S11 through S13 are executable in such a period of time as to ascertain the writable size (S11) and to transmit the command for executing the software reset (S13). The host MC 11 is therefore enabled to make the communication IC 12 execute the software reset by transmitting the reset command to the communication IC 12 before the communication IC 12 performs the hardware reset upon detecting the abnormality caused by the timeout and equivalents.

The communication IC 12 executes the software reset upon receiving the command. With the software reset being done the communication IC 12 halts the process of receiving the data, of which the abnormality is detected, and erases the data received in the process concerned from the SPI communication buffer. The communication IC 12 is thereby returned to the state before receiving the data write in S3. After the communication IC 12 completes the software reset, the host MC 11 and the communication IC 12 return to the normal state. Then, the host MC 11 executes again the data write in S3, of which the abnormality is detected.

FIG. 5 is a flowchart illustrating processes of the host MC 11 in the embodiment. In these processes, the host MC 11 transmits the command to the communication IC 12, and ascertains the writable size (P1). The host MC 11 designates a write buffer size (which is also referred to as a write data size) that is within the ascertained writable size in the communication IC 12 (P2). The host MC 11 executes writing the data to the communication IC 12 (P3).

The host MC 11 re-ascertains the writable size by transmitting the command to the communication IC 12 (P4). The host MC 11 determines whether the SPI communication buffer of the communication IC 12 is available over an entire area, in other words, whether the SPI communication buffer of the communication IC 12 is empty, i.e., whether the writable size returns to the value before the data write in P3 (P5). When the writable size returns to the value before the data write in P3, the host MC 11 finishes the data write process. Whereas when determining in P5 that the writable size does not return to the value before the data write in P3, the host MC 11 transmits the command for executing the soft rest to the communication IC 12 (P6). The host MC 11 then finishes processing. After the communication IC 12 completes the software reset, the host MC 11 executes again the data write process.

Effects of Embodiment

As discussed above, in the communication control apparatus 1 according to the embodiment, the host MC 11, after writing the data to the communication IC 12, determines whether the SPI communication buffer is empty, i.e., whether the writable size returns to the value before the data write in P3 of FIG. 5. With this determination being made, the host MC 11 is enabled to determine whether the data written to the SPI communication buffer are transferred to the transfer destination buffer after the communication IC 12 normally receives the data. The data written to the SPI communication buffer are not transferred to the transfer destination buffer, in which case the host MC 11 determines that the abnormality occurs in the data write to the communication IC 12, and transmits the command for causing the communication IC 12 to execute the software reset. Herein, the case that the data written to the SPI communication buffer are not transferred to the transfer destination buffer is a case in which at least some proportion of the written data are saved in the SPI communication buffer. As a result, the occurrence of the abnormality is detected in the communication IC 12, thereby enabling the execution of the hardware reset to be avoided. With the hardware reset being done, the computer program exemplified by the firmware and software on the memory in the communication IC 12 is cleared. Consequently, the communication control apparatus 1 requires a considerable period of time for restoration, resulting in stoppage of a variety of processes to be provided to users. There might be a case in which the stoppage of the processes exceeds a limit of time for which the users can wait. For example, the users might feel that it is difficult for the communication control apparatus 1 to charge the battery with the electric power due to the stoppage of these processes.

In the embodiment, however, the host MC 11 detects that the abnormality occurs in the data write, and makes the communication IC 12 perform the software reset. Therefore, for instance, only one data writing process is reset and then re-executed, thereby enabling such a possibility to be enhanced that the communication control apparatus 1 returns to the normal state, and the restoration to the normal state may be made in a short period of time. The communication control apparatus 1 is also enabled to enhance such a possibility as to make successful the data write that once fails in execution. The communication control apparatus 1 is capable of keeping the original functions to the greatest possible degree. In other words, even the communication control apparatus 1 configured not to be equipped with the mechanism for detecting the communication error is capable of simply handling the communication error and restoring the system functions as early as possible or keeping the system functions to the greatest possible degree. It is therefore feasible to reduce a burden on the user, which the occurrence of the communication error accompanies with.

In the embodiment, when the communication IC 12 detects the abnormality, the host MC 11 transmits to the communication IC 12 the reset command for causing the communication IC 12 to execute the software reset before performing the hardware reset. Hence, it is feasible for the host MC 11 to avoid such an event that the communication IC 12 detects the occurrence of the abnormality and executes the hardware reset.

In the embodiment, the writable size of the data to the communication IC 12 is obtained before and after writing, i.e., transmitting the data to the communication IC 12 from the host MC 11. When there is the discrepancy between the writable sizes before and after writing, i.e., transmitting the data, the host MC 11 determines that at least some proportion of the written data are saved, i.e., that the abnormality occurs in the data write. Accordingly, the occurrence of the abnormality is surely easily grasped before and after writing, i.e., transmitting the data.

Modified Example

The communication control apparatus 1 is exemplified by way of one example of the charging system mounted in the EV in the embodiment. It does not, however, mean that the communication control apparatus 1 according to the embodiment is limited to the charging system mounted in the EV. The configuration of the communication control apparatus 1 is available for a various equipment, electronic devices and equivalents other than the EV. The configuration of the communication control apparatus 1 according to the embodiment easily detects the communication error and facilitates the avoidance of such a situation that the system gets into the hardware reset even in a case where the system does not include any mechanism of detecting the error in the communications between the multiple ICs on the single board. As a consequence, it is feasible for the original functions of the system to be restored at an early stage or to be kept to the greatest possible degree.

In the embodiment, the host MC 11 determines whether the writable size returns to the value before the data write in S3. To be specific, the host MC 11 determines that the writable size does not return to the value before the data write when there is the discrepancy between the writable sizes of the data to the communication IC 12 before and after writing the data. Then, the host MC 11 transmits the command for executing the software reset to the communication IC 12. It does not, however, mean that the determination of whether the command for executing the software reset is to be transmitted, is limited to the process described above. For example, the host MC 11 may determine whether the command for executing the software reset is to be transmitted, depending on whether the writable size obtained in S11 takes a maximum value after the data write in S3. Herein, an expression that the writable size takes the maximum value connotes that the writable size is a buffer size of the SPI communication buffer.

For instance, it is assumed that each time the host MC 11 writes the data to the communication IC 12, all the data written to the communication IC 12 are transferred to the transfer destination buffer from the SPI communication buffer, thus clearing the data from the SPI communication buffer. The communication IC 12 executes the process described above, in which case the data are not saved in the SPI communication buffer but are cleared when the data are normally written. Therefore, the host MC 11 may simply determine whether the command for executing the software reset is to be transmitted, depending on whether the writable size obtained in S11 takes the maximum value after the data write in S3. Herein the maximum value represents the buffer size of the SPI communication buffer. The host MC 11 is therefore enabled to easily determine whether the data are normally written to the communication IC 12 and whether the written data are saved in the SPI communication buffer. The host MC 11 is consequently enabled to easily determine whether the command for executing the software reset is to be transmitted.

What is claimed is:

1. A communication control apparatus comprising:
   a communication apparatus configured to
      save received data in a reception buffer,
      execute transfer of the received data to a transfer destination buffer from the reception buffer,
      erase the transferred data from the reception buffer, and
      perform a hardware reset upon detecting an abnormality; and
   a controller configured to
      transmit data or a command to the communication apparatus,
      check whether, after transmitting the data to the communication apparatus and after a lapse of time from (i) reception of the data by the communication apparatus to (ii) erasure of the data, the transmitted data are saved in the reception buffer, and when at least some non-zero proportion of the transmitted data are saved in the reception buffer, transmit a command for causing the communication apparatus to execute a software reset instead of the communication apparatus performing the hardware reset upon detecting the abnormality.

2. The communication control apparatus according to claim 1, wherein the controller obtains, from the communication apparatus, a writable size of the data before transmitting the data to the communication apparatus, further obtains, from the communication apparatus, a writable size of the data after transmitting the data to the communication apparatus, and determines that at least some non-zero proportion of the transmitted data are saved in the reception buffer when there is a discrepancy between the writable sizes of the data before and after transmitting the data to the communication apparatus.

3. The communication control apparatus according to claim 1, wherein the controller obtains, from the communication apparatus, a writable size of the data after transmitting the data to the communication apparatus, and determines that at least some non-zero proportion of the transmitted data are saved in the reception buffer when the obtained writable size does not take a maximum value writable to the communication apparatus.

4. A communication method between:

a communication apparatus configured to
  save received data in a reception buffer,
  execute transfer of the received data to a transfer destination buffer from the reception buffer,
  erase the transferred data from the reception buffer, and
  perform a hardware reset upon detecting an abnormality; and a controller configured to transmit data or a command to the communication apparatus, the method comprising:

checking by the controller whether, after transmitting the data to the communication apparatus and after a lapse of time from (i) reception of the data by the communication apparatus to (ii) erasure of the data, the transmitted data are saved in the reception buffer; and transmitting by the controller, when at least some non-zero proportion of the transmitted data are saved in the reception buffer, a command for causing the communication apparatus to execute a software reset instead of the communication apparatus performing the hardware reset upon detecting the abnormality.

* * * * *